United States Patent [19]

Diefenbach et al.

[11] Patent Number: 4,477,530

[45] Date of Patent: Oct. 16, 1984

[54] HEAT-HARDENABLE BINDER MIXTURE

[75] Inventors: Horst Diefenbach, Nottuln; Michael Geist, Münster, both of Fed. Rep. of Germany

[73] Assignee: BASF Farken & Fasern AG, Hamburg, Fed. Rep. of Germany

[21] Appl. No.: 425,078

[22] PCT Filed: Jan. 26, 1982

[86] PCT No.: PCT/DE82/00015

§ 371 Date: Sep. 23, 1982

§ 102(e) Date: Sep. 23, 1982

[30] Foreign Application Priority Data

Feb. 4, 1981 [DE] Fed. Rep. of Germany ....... 3103642

[51] Int. Cl.$^3$ .......................... B32B 27/38; B05D 3/02
[52] U.S. Cl. ................................ 428/413; 204/181 C; 427/27; 427/385.5; 427/386; 427/388.2; 428/418; 428/423.1; 428/425.8; 428/463; 428/522
[58] Field of Search .............. 204/181 C; 427/27, 386, 427/385.5, 388.2; 428/413, 423.1, 418, 425.8, 463, 522

[56] References Cited

U.S. PATENT DOCUMENTS

| | | | |
|---|---|---|---|
| 4,096,105 | 6/1978 | McGinniss | 204/181 C X |
| 4,340,523 | 7/1982 | Haian | 204/181 C X |
| 4,352,842 | 10/1982 | Kooymans et al. | 427/385.5 |
| 4,423,169 | 12/1983 | Valko | 523/414 |

*Primary Examiner*—Thurman A. Page
*Attorney, Agent, or Firm*—Wells & Wells

[57] ABSTRACT

A heat-hardenable binder mixture based on organic resins comprises an organic resin having primary and/or secondary and, if appropriate, also additional tertiary amino groups and a crosslinking agent based on an organic compound which contains at least 2 β-hydroxyalkyl ester groups. The binder mixture can additionally contain pigments, fillers, crosslinking catalysts, corrosion inhibitors and other paint auxiliaries. The binder mixture is used in a process for preparing coatings by applying a coating agent in the form of a film to a substrate and subsequently hardening the film by stoving.

26 Claims, No Drawings

HEAT-HARDENABLE BINDER MIXTURE

BACKGROUND OF THE INVENTION

The invention relates to a heat-hardenable binder mixture based on organic resins.

Many and varied chemical reactions have been proposed and also used, to harden, by crosslinking, the binders in paint films. The chemical bonds formed during the crosslinking reaction frequently do not satisfy all requirements which paint films have to meet. Thus, ester bonds are sensitive to hydrolysis, and amine groups can form hydrophilic imperfections in the stoved film.

In the case of 2-component systems, frequently one of the reactive groups must be blocked to prevent premature reaction. The compounds then evolved during stoving pollute the environment, in particular in the case of amines or phenols.

Electrocoating lacquering has become widely established in recent years for primer-coating electrically conductive substrates. Hitherto anodic electrocoating primer-coating has been prominent. The resin binders used for this purpose belong to the resins containing carboxyl groups, for example to maleate oils, maleated epoxide resins, alkyd resins, acrylic resins and, in particular, to maleated polybutadienes. These resins are rendered water-soluble by salt formation, chiefly with amines, and deposited by direct current at the anode in the electrocoating bath. However, the anodic electrocoating primer-coating process has serious disadvantages. Thus, electric deposition at the anode evolves oxygen, which can modify the resins depositing at the anode in a serious, unfavorable manner. Furthermore, iron ions from the anode enter the solution and are contained as imperfections in the stoved film and lead to discoloration and spots. They cause qualitative disadvantages in particular by salt formation and hence by lowering resistance to water and corrosion resistance.

The cathodic electrocoating primer-coating process developed in recent years to the marketable stage displaces in an increasing extent the anodic process, since the deficiencies described above are largely avoided. Thus, hydrogen, which does not affect the resin binder, forms during the deposition process at the cathode, where the paint film is now deposited.

The binders suitable for cathodic deposition predominantly contain amino groups, which are neutralized by means of acids to obtain solubility in water (German Offenlegungsschrift No. 2,345,044).

However, hydrophilic amino groups remaining in the stoved film are a disadvantage, since they cause lowering of the corrosion resistance. Although, in the crosslinking, the amino groups are converted by reaction with blocked isocyanates into the less hydrophilic urethane group, the blocking agents, such as, for example, phenol or ketoximes, are simultaneously liberated.

Depending on the type of structure of the amino groups necessarily contained in the resin, these groups can also be thermally eliminated by β-elimination (German Offenlegungsschrift No. 2,363,074 corresponding to U.S. Pat. No. 3,935,074 and German Offenlegungsschrift No. 2,753,861). The resulting contamination of the exit air by large amounts of eliminated protective groups from the blocked isocyanates and amines must also be considered a disadvantage of this process.

SUMMARY OF THE INVENTION

It is the object of the invention to avoid these disadvantages of the state of the art and to provide a binder mixture for preparing coating agents which produce coatings having excellent technical properties. Environmental pollution on application of the corresponding coating agents is intended to be lowered by the binder mixture according to the invention. The coating agents based on the binder mixture according to the invention are also intended to be suitable for all types of application methods, ie. it should be possible to use the binder mixture for stoving lacquers to be applied by conventional methods, for powder lacquers, for aqueous powder slurries and for electrocoating baths.

This object is achieved according to the invention with a binder mixture of the abovementioned type and which is comprised of the components (A) an organic resin having primary and/or secondary and, if appropriate, also additional tertiary amino groups and (B) a crosslinking agent based on an organic compound containing at least 2 β-hydroxyalkyl ester groups.

The binder mixture advantageously contains in addition to the components A and B as component C pigments, fillers, crosslinking catalysts, corrosion inhibitors and other paint auxiliaries.

Advantageously the proportion of component A is 50–95% by weight and of component B 5–50% by weight, the total amount of the components A and B being 100%.

DESCRIPTION OF THE PREFERRED EMBODIMENTS

During the stoving step, the β-hydroxyalkyl ester groups of the component B react with the primary and/or secondary amino groups of the component A and form an amide bond. The basic nitrogen of the amino group of the resin of the component A is thus converted in the stoved film into an amide nitrogen of neutral pH. The stoved film thus does not contain any defects of basic pH. The principle of the crosslinking mechanism is described in the following reaction scheme:

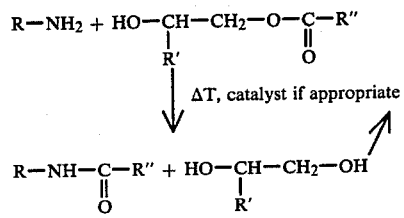

On stoving, virtually no amino groups are eliminated, and exit air problems are thus reduced. The eliminated diols preferably have a boiling point which is such that, during the stoving process, they can advantageously act as flow auxiliaries.

The amide bond formed during stoving has a very advantageous effect on the adhesion of the film, in particular on metal substrates. The elasticity of the film is also increased thereby. This crosslinking mechanism effects high resistance of the paint film to solvents, alkalis and salt spray mists. Even on nonpretreated sheet iron the films form very resistant coatings even without corrosion inhibitors.

Component A of the binder mixture advantageously has a number average molecular weight of 500 to 20,000, preferably of 600 to 10,000. The amine equivalent weight of component A of the binder mixture is 150 to 7,500, preferably 200 to 5,000.

Component A is an organic resin having primary and/or secondary amino groups. If appropriate, tertiary amino groups can also be additionally present.

To prepare component A, the primary and/or secondary amino groups are introduced into the organic resin preferably by reaction of a polyamine and/or of a ketimine containing amino and/or hydroxyl groups with resins which, per molecule, contain at least one, preferably at least two, epoxide groups or isocyanate groups.

However, component A can also be obtained by other addition reactions, for example by esterifying or amidating compounds carrying primary and/or secondary amino groups with resins containing groups suitable for this purpose.

Resins containing epoxide groups, preferably terminal epoxide groups, and which are from the group comprising polyglycidyl ethers, polyglycidyl esters and polyglycidyl amines prove particularly suitable for preparing component A.

Other resins containing epoxide groups and particularly suitable are copolymers of glycidyl acrylate and/or methacrylate or of another olefinically unsaturated, polymerizable compound carrying a glycidyl group with alkyl and/or hydroxyalkyl acrylates and/or methacrylates and/or vinyl compounds, such as styrene, vinyltoluene or vinylcarbazole.

Another preferably suitable group of resins are partially epoxidized polybutadiene oils.

Polyglycidyl ethers within the scope of this invention are preferably understood as meaning those polyglycidyl ethers of the general formula tive groups of the epoxide resin can be reacted with other compounds. Suitable for this purpose are (a) compounds containing carboxyl groups, such as saturated or unsaturated monocarboxylic acids (for example benzoic acid, linoleic fatty acid, 2-ethylhexanoic acid or versatic acid), aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid or dimethylolpropionic acid) and polyesters containing carboxyl groups or (b) compounds containing amino groups, such as diethylamine or ethylhexylamine or diamines having secondary amino groups, such as, for example, N,N'-dialkylalkylenediamine, such as dimethylethylenediamine, N,N'-dialkylpolyoxyalkyleneamine, such as N,N'-dimethylpolyoxypropylenediamine, cyanoalkylated alkylenediamines such as bis-N,N'-cyanoethylethyldiamine, cyanoalkylated polyoxyalkyleneamines, such as bis-N,N'-cyanoethylpolyoxypropylenediamine, polyaminoamides, such as Versamide®(Schering AG) or the product from reacting one mole of diaminohexane with two moles of monoglycidyl ethers or monoglycidyl esters, specifically glycidyl esters of α-branched fatty acids such as versatic acid or (c) compounds containing hydroxyl groups, such as neopentylglycol, bis-ethoxylated neopentylglycol, neopentylglycol hydroxypivalate, dimethylhydantoin-N,N'-diethanol, 1,6-hexanediol, 2,5-hexanediol, but-2-ene-1,4-diol, but-2-yne-1,4-diol, hex-3-yne-2,5-diol or other alkynediols, 1,4-bis-(hydroxymethyl)-cyclohexane, 1,1-isopropylidene-bis-(p-phenoxy)-2-propanol, trimethylolpropane, pentaerythritol or amino-alcohols such as triethanolamine, methyldiethanolamine or alkylketimines containing hydroxyl groups, such as aminomethylpropane-1,3-diol methylisobutylketimine or tris-(hydroxymethyl)-aminomethanecyclohexanoneketimine and also polyglycol ethers, polyester-

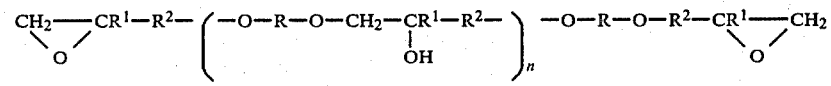

with

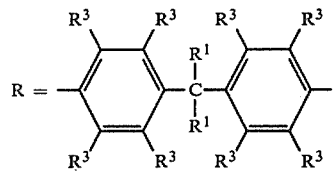

$R^1=H$ or $C_nH_{2n+1}$ $R^2 = (CR_2^1)_n$ $R^3=R^1$, halogen or preferably H and $n=0$ to 5.

The polyglycidyl ethers of the general formula shown have a number average molecular weight of about 340 to 5,000 and, correspondingly, an epoxide equivalent weight of 170 to 2,500. The epoxide resins used can also be hydrogenated or partially hydrogenated. To control the film properties, some of the reacpolyols, polyether-polyols, polycaprolactone-polyols, polycaprolactam-polyols of various functionality and molecular weights.

Instead of using polyglycidyl ethers based on bisphenol A, it is also possible to use polyglycidyl ethers based on other basic components, for example heterocyclic compounds, such as diglycidylhydantoins or also triglycidyl isocyanurate.

Suitable polyglycidyl esters are resins containing epoxide groups and which can be prepared by introducing glycidyl groups into COOH-functional resins, for example via epichlorohydrin. The epoxide equivalent weight of these products is between 200 and 2,500. To control the film properties, some of the remaining, reactive glycidyl groups can be reacted with other compounds. Suitable for this purpose are the compounds mentioned above under a, b and c.

Polyglycidylamines are understood as meaning those resins containing glycidyl groups which are obtainable by introducing glycidyl groups, for example via epichlorohydrin, into $NH_2$-functional resins.

Copolymers of glycidyl acrylate and/or methacrylate or of another olefinically unsaturated, polymerizable compound carrying a glycidyl group with esters of acrylic and/or methacrylic acid and polymerizable vinyl compounds and which have a number average molecular weight of 700 to 10,000 and an epoxide equivalent weight of 600 to 3,000 are also particularly suitable. Acrylates with $C_2$- to $C_8$-alcohols and methacrylates with $C_1$- to $C_4$-alcohols are preferable. The copolymers can also contain other monomers, such as hydroxyalkyl (meth)acrylate or (meth)acrylamide. Copolymerization is carried out in a well known way by solution, suspension or emulsion polymerization with added free radical initiators such as peroxides, hydroperoxides, peresters or thermolabile azo compounds and, if appropriate, molecular weight regulators.

Partially epoxidized polybutadiene oils are understood as meaning reaction products obtained by reacting commercially available polybutadiene oils with peracids or with organic acid/$H_2O_2$ mixtures. The preparation method is described, for example, in Chemiker-Zeitung 95, 857 et seq. (1971).

The resins containing epoxide groups are reacted with polyamines and/or a ketimine containing amino and/or hydroxyl groups to give component A. If the compounds carrying primary and secondary amino groups are added in the form of their ketimines, the reaction conditions must be controlled in such a way that no substances which can decompose ketimines remain in the reaction product. The preferable ketimines are products from reacting ketones and alkylamines or alkyldiamines containing hydroxyl or secondary amino groups and having the general structure R—NH—R—$NH_2$ or HO—R—$NH_2$. The ketimines have, for example, the following structure:

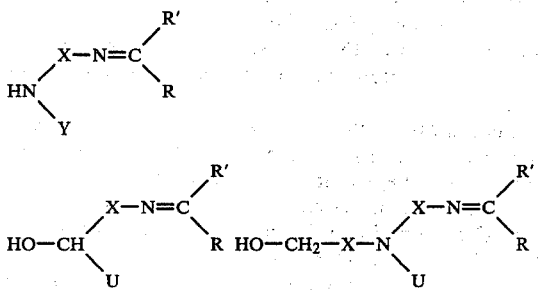

in which

X = —$(CR_2)_n$—
R = —H, —R'
R' = —$C_mH_{2m+1}$, —$C_6H_{11}$
U = —R, —Y $$Y = -X-N=C\begin{matrix}R' \\ \diagdown \\ R\end{matrix}, -X-OH, -R' \text{ oder}$$

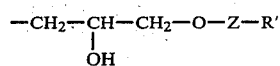

$$Z = \begin{matrix}\diagdown \\ \diagup\end{matrix} CO, -X$$

n = 1–6 and
m = 1–12.

The ketones used for the reaction with the primary amino groups are in general aliphatic ketones, such as methyl ethyl ketone, diethyl ketone, methyl isobutyl ketone or ethyl n-propyl ketone, or cycloaliphatic ketones, such as cyclopentanone or cyclohexanone. Preferable aminoalkylamines and alkanolamines are predominantly diethylenetriamine, N-methylethylenediamine, N-methylpropylenediamine, N-aminoethylpiperazine, 2-aminoethanol, 1-aminopropan-2-ol, 1-aminopropan-3-ol, 2-amino-2-methylpropan-1-ol, 3-amino-2,2-dimethylpropan-1-ol, 1,5-diaminopentan-3-ol or N-(2-aminoethyl)-N-(2-hydroxyethyl)-ethylenediamine.

The exothermal addition of the aminoketimines described above to the epoxide groups of the base resin of the binder component A is generally carried out at room temperature. For complete conversion, the reaction is in many cases completed at temperatures between 50° and 125° C.

The hydroxyketimines are added to the epoxide groups of the base resin of the binder component A as a rule within the same temperature range, but the use of a basic catayst such as N,N-dimethylbenzylamine or of a Friedel-Crafts catalyst, such as tin(II) chloride, is advisable.

The base resin used for preparing the binder component A can also be base resins having at least 2 isocyanate groups. Preferable resins containing isocyanate groups are higher-functional polyisocyanates which are prepared by trimerization or oligomerization from diisocyanates or polyisocyanates and polyfunctional compounds containing OH or NH groups. Typical isocyanates are toluylene diisocyanate, hexamethylene diisocyanate, 4,4'-diphenylmethane diisocyanate, 4,4'-dicyclohexylmethane diisocyanate, 1,6-diisocyanato-2,2,4-trimethylhexane and 1-isocyanatomethyl-3-isocyanato-1,5,5-trimethylcyclohexane. Isocyanate-containing prepolymers based on polyglycol ethers, polyester-polyols, polyether-polyols, polycaprolactone-polyols, polycaprolactam-polyols or polyamino-amides can also be advantageously used.

The binder component B, the crosslinking agent, is a compound containing at least 2 β-hydroxyalkyl ester groups. The crosslinking agent can be a low molecular weight compound or an appropriately substituted resin. If the esterification is carried out not with an alcohol having an additional OH group at the β-carbon atom, but by using monoalcohols such as methyl, ethyl or butyl alcohol, the amidation reaction proceeds at a considerably lower rate.

In this case the crosslinking rate is too low and the stoved film is not sufficiently resistant to solvents. These disadvantages are circumvented when, in accordance with the invention, β-hydroxyalkyl esters are used for the amidation reaction. The compounds forming the cross-linking agent preferably are polyester resins, but it is also possible to use other compounds containing free carboxyl groups and accessible to esterification. These compounds can also contain primary, secondary or tertiary nitrogen atoms, which have to be protonated with acid. In order for the resins to be soluble in water they can also be modified with ammonium groups or by sulfide/acid or phosphine/acid mixtures. Resins of this type are suitable, for example, for electrocoating lacquering.

Poly-(2-hydroxyalkyl) esters of polycarboxylic acids are preferably used as the trans-esterification component. These esters include, inter alia, bis-(2-hydroxypropyl) azelate, bis-(2-hydroxypropyl) succinate, bis-(2-hydroxybutyl) adipate, bis-(2-hydroxybutyl) maleate and bis-(2-hydroxybutyl) terephthalate.

Polyfunctional crosslinking agents can advantageously be prepared as follows. First, equivalent proportions of a dicarboxylic anhydride (phthalic anhydride, hexahydrophthalic anhydride, trimellitic anhydride or succinic anhydride) are reacted at temperatures below 145° C. with a polyol (glycerol, trimethylolpropane, pentaerythritol or dipentaerythritol). The resulting acid intermediate product is then reacted with equivalent proportions of an epoxyalkane to give the final product.

The crosslinking agent can also be a maleated polybutadiene oil. The $\beta$-hydroxyalkyl ester groups can be introduced, for example, via the reaction path described below. The anhydride ring of the maleic anhydride added to the polybutadiene is first opened up by means of a dialkylamino-alkanol of the following general structure.

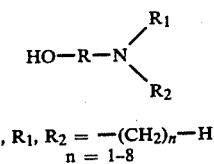

R, $R_1$, $R_2$ = —$(CH_2)_n$—H
n = 1–8

The acid group formed on opening the anhydride is then reacted with a monoepoxide in order to prepare the $\beta$-hydroxyalkyl ester desired. Depending on the degree of maleation, it is advantageous to use a mixture of the dialkylamino-alkanol described and of a monoalcohol, such as propanol or butanol, in order to limit the proportion of tertiary nitrogen atoms in the crosslinking agent component.

Component B advantageously is a polyacrylate resin formed from the following monomers:
  (a) 10–50% by weight of an alkyl acrylate having 1 to 18 carbon atoms in the alkyl radical and/or alkyl methacrylate having 2 to 18 carbon atoms in the alkyl radical,
  (b) 0–60% by weight of methyl methacrylate,
  (c) 0–35% by weight of styrene, $\alpha$-methylstyrene, o- and/or p-chlorostyrene, p-tert.-butylstyrene, vinyltoluene and/or vinylcarbazole and
  (d) 2–35% by weight of a $\beta$-hydroxyalkyl acrylate and/or methacrylate or of another olefinic, unsaturated polymerizable compound containing $\beta$-hydroxyalkyl ester groups, the total amount of the constituents a, b, c and d being 100%.

The binder mixture according to the invention can be present in a finely divided, solid form or dissolved in an organic solvent.

For electrocoating lacquering it is necessary that after protonation with acid the binder mixture is present in the form of an aqueous solution or dispersion. Solubility in water of the binder component A and/or of the crosslinking agent component B is effected by neutralizing the primary, secondary and/or tertiary amino groups contained in them with acids. Suitable acids are in particular organic acids, but it is also possible to use, for example, hydrochloric acid, sulfuric acid, phosphoric acid or carbonic acid. The amino groups are preferably neutralized with formic acid, acetic acid, malonic acid, lactic acid or citric acid.

The acids mentioned can also be used when the solubilizing groups for the binder component and/or for the crosslinking agent component are introduced by adding an ammonium group or the salt of a sulfide/acid or phosphine/acid mixture to the binder or the crosslinking agent.

The degree of neutralization of the solubilizing groups, relative to these groups, is between 0.2 to 1.0 equivalent and preferably between 0.25 to 0.6 equivalent of acid.

The neutralization can be carried out in the following ways. The acid is initially introduced in water, if appropriate together with dispersing auxiliaries, and the resin solution is stirred at room temperature or, if appropriate, at elevated temperatures into the water. However, the acid can also be added directly to the resin solution. The neutralized resin solution can then be stirred into the water, but, if appropriate, the water can also be slowly incorporated into the resin solution.

The dispersion, to control its viscosity, the deposition voltage and flow, can contain up to 20% of organic solvents. If, due to the preparation method chosen, the batch contains too much solvent or even solvents having an adverse effect on the properties, the solvents can be distilled from the resin solution before dispersing or they are distilled from the aqueous dispersion. It is advantageous for the entirety of all properties that the content of organic solvents is as low as possible.

The solids content of a deposition bath made up by means of the dispersion according to the invention is as a rule 7–35 parts by weight, but preferably 12–25 parts by weight. The pH value of the deposition bath is between 4 and 8, but preferably between 5 and 7.5. The anodes used for the deposition bath are non-corroding steel anodes or graphite anodes. The temperature of the bath batch should be between 15° and 35° C., preferably between 20° and 30° C. The deposition time and voltage are so chosen that the desired film thickness is obtained.

After deposition, the coated object is rinsed off and is ready for stoving.

Regardless of which application method is used for the coating agents prepared using the binder mixture according to he invention, crosslinking of the paint film is effected during stoving at temperatures of 130° to 200° C. for a period of 10–60 minutes, preferably at 150° to 180° C. for 15–30 minutes.

The amidation reaction can also be accelerated by using suitable catalysts. Compounds particularly suitable for this purpose are ammonium compounds such as benzyltrimethylammonium hydroxide, benzyltrimethylammonium chloride, trimethylcetylammonium bromide or tetraammonium iodide and organic tin compounds, such as dibutyltin dilaurate, and iron(III) acetylacetonate, zinc acetate, zinc 2-ethylhexoate, cobalt naphthenate, lead acetate and butyl titanate.

Pigmentation is carried out in a well-known way, in which the pigments and customary additives, such as fillers, corrosion inhibitors and antifoam agents, are milled in one of the two binder components. Examples of milling units which can be used are sand mills, ball mills and three-roll mills. The paint can be completed in a generally known way.

The individual components A and B, and, if appropriate, the component C, can be mixed in the form of their concentrated solutions or dispersions and jointly dispersed. However, it is also possible to disperse the components A and B singly, the pigments having been ground in A or B, and to mix the dispersion of the individual components in the necessary ratio. In a further advantageous embodiment, it is also possible to prepare the component A in the presence of the component B.

The invention also relates to a process for preparing coatings by applying a coating agent in the form of a film to a substrate and stoving, which coating agent contains a binder mixture, which process comprises a mixture of the components (A) an organic resin having primary and/or secondary and, if appropriate, also additional tertiary amino groups and (B) a crosslinking agent based on an organic compound which contains at least 2 $\beta$-hydroxyalkyl ester groups.

Advantageous embodiments of the process according to the invention result from sub-Claims 11 to 20.

The invention also relates to the use of a binder mixture for preparing coatings, which use comprises using a mixture of the components (A) an organic resin having primary and/or secondary and, if appropriate, also additional tertiary amino groups and (B) a crosslinking agent based on an organic compound which has at least 2 $\beta$-hydroxyalkyl ester groups.

Advantageous embodiments of the use according to the invention result from sub-Claims 22 to 33.

Below, the invention is illustrated in more detail by means of illustrative examples.

EXAMPLE 1

(Preparation of a B component)

109 g of pentaerythritol are mixed with 474 g of phthalic anhydride in a 4-necked flask equipped with a reflux condenser, stirrer, internal thermometer and gas inlet, and the mixture is heated under an atmosphere of nitrogen to 140° C. Thereafter the reaction proceeds exothermally and is maintained by cooling at 160° C. The batch is cooled at an acid number of 305, and 300 g of MIBK are added. 231 g of butylene oxide are slowly added dropwise at 90° C., and the batch is maintained at the temperature until the acid number has dropped to zero.

EXAMPLE 2

(Preparation of a B component)

1,584.6 g of hexahydrophthalic acid are heated to 130° C. in a reaction flask together with 511.0 g of triethanolamine. The reaction then commences, and the temperature increases. The temperature is maintained at 160° C. by external cooling. On reaching an acid number of 275, the batch is cooled down to 90° C., and 900 g of methyl ethyl ketone are added. 596.8 g of propylene oxide are then slowly added dropwise. The reaction is continued at 90° C. until the acid number is <3.

EXAMPLE 3

(Preparation of a B component)

2,340 g of glycidyl 2-methyl-2-ethylheptanoate are heated to 130° C. in a reaction vessel together with 2,073 g of trimellitic anhydride. This initiates the strongly exothermal reaction. The reaction is maintained at 150° C. by external cooling until an acid number of 183 is reached. The batch is then cooled down to 90° C., and 1,450 g of methyl isobutyl ketone are added. 835 g of propylene oxide are then slowly added dropwise. The reaction is discontinued at an acid number of <2. The solids content of the resin solution is 75%.

EXAMPLE 4

(Preparation of a B component)

560 g of xylene are initially introduced under an atmosphere of nitrogen in a 5 l reactor and heated to the reflux temperature. A monomer mixture of 1,400 g of methyl methacrylate, 560 g of 2-hydroxypropyl acrylate and 840 g of ethylhexyl methacrylate and 14 g of dodecylmercaptan are added dropwise in the course of 4.5 hours. 140 g of tert.-butyl peroctoate in 200 g of xylene are metered in at the same time. Polymerizing is then continued until a constant viscosity of 4.1 dPa, 50% strength in xylene, is obtained.

The number average molecular weight, measured by gel permeation chromatography, is 2,100 and the OH number is 80.

EXAMPLE 5

A. 1,188 parts by weight of bis-(4-hydroxycyclohexyl)-2,2-propane bis-glycidyl ether, 308 parts by weight of bisphenol A, 675 parts by weight of polytetrahydrofuran (molecular weight 1,000) and 189 parts by weight of xylene are initially introduced into a 4 l reactor. 5 parts by weight of dimethylbenzylamine are added as catalyst. The mixture is heated to 170° C. and maintained for half an hour at this temperature. The mixture is then cooled down to 136° C., and a further 10 parts by weight of dimethylbenzylamine are added. The temperature is maintained until an epoxy equivalent weight of 1,500 has been reached. The mixture is then cooled down to 85° C., and 725 parts by weight of a 75% strength crosslinking agent solution (component B according to Example 3) are added. The temperature is again allowed to rise to 85° C., and 515 parts by weight of a 70% strength solution of 1 mole of diethylenetriamine and 2 moles of methyl isobutyl ketone are added. The batch heats up during this addition. The temperature is maintained by external cooling for 60 minutes between 95° and 100° C.

B. In the meantime, a mixture of 4,070 parts by weight of deionized water, 81 parts by weight of acetic acid and 21 parts by weight of a commercially available defoamer based on a long-chain alcohol has been prepared. The resin solution described in A is then dispersed in this mixture. The dispersion has a solids content of 40% and a degree of neutralization of the amine groups of 33%. After one hour a further 970 parts by weight of water are added to adjust the solids content to 35%.

EXAMPLE 6

A. The batch described in Example 5A was repeated, and a water/acetic acid mixture (162 g of acetic acid + 64 g of water) was added at room temperature, to effect 100% neutralization of the amine groups. The mixture was then diluted with deionized water to a solids content of 50%.

B. A pigment paste having a Hegman fineness of 6 to 7 was prepared in a milling unit from the components 2,380 g of the 50% strength resin solution obtained according to Example 6A, 1,670 g of coal dust, 200 g of lead silicate and 1,200 g of deionized water. More deionized water was then added. The pigment paste had a solids content of 56.1%, a resin content of 21.8% and a pigment solids content of 34.3%. The paste has excellent thermal stability on storage.

EXAMPLE 7

2,434.5 g of deionized water are added to 287.5 g of the binder mixture described in Example 5B and 178 g of the pigment paste described in Example 6B. The solid content of the resulting deposition bath is 16%. The pH value is 7.5. The breakthrough voltage bath is 370 to 380 V. Sheets of steel treated with zinc phosphate were coated for 120 seconds at a bath temperature of 25° C. and 300 Volt. Films resulted which, after 20 minutes stoving at 160° C., produced a smooth, well adhering layer of 30 μm.

EXAMPLE 8

(Preparation of an A component)

In a 6 l reactor, 1,453 g of a 90% strength solution of the ketimine formed from monoisopropanolamine and methyl ethyl ketone in methyl ethyl ketone are added to 3,380 g of partially epoxidized polybutadiene (molecular weight 2,600 and 4.8% by weight of epoxide oxygen), and 32.5 of phenol are added as catalyst. The mixture is heated to 160° C. and maintained at this temperature until epoxide oxygen is no longer detectable. The batch is then cooled down to 90° C. and dispersed in a mixture of 6,210 g of deionized water, 281 g of lactic acid and 55 g of the defoamer described in Example 5B. The dispersion has a solids content of 40% and a degree of neutralization of the amine groups of 40%.

EXAMPLE 9

2,400 g of the crosslinking agent component B described in Example 2 are dispersed in a mixture of 205 g of lactic acid and 1,000 g of deionized water. 780 g of coal dust, 150 g of iron brown and 75 g of strontium chromate are added to this resin solution. The starting materials are mixed with 890 g of deionized water and comminuted, in a milling unit, down to a Hegman fineness of 5 to 7. The pigment paste has a crosslinking agent content of 32.7% and a pigment content of 18.3%.

EXAMPLE 10

500 parts by weight of the component A obtained according to Example 8 and 196 parts by weight of the pigment paste obtained according to Example 9 are mixed with 804 parts by weight of deionized water. The bath batch contains 20% of non-volatile components. This deposition bath has a pH value of 6.2. Films deposited onto zinc phosphatized sheets of metal in the course of 2 minutes at 300 volt and stoved for 30 minutes at 170° C. have a smooth, hard non-yellowed surface. The film thickness is 25 μm. Adhesion to the sheets of metal is excellent.

EXAMPLE 11

1,188 parts by weight of bis-(4-hydroxycyclohexyl)-2,2-propane bis-glycidyl ether, 308 parts by weight of bisphenol A, 675 parts by weight of polytetrahydrofuran (molecular weight 1,000) and 189 parts by weight of xylene are initially introduced into a 4 l reactor. 5 parts by weight of dimethylbenzylamine are added as catalyst. The mixture is heated to 170° C. and maintained for half an hour at this temperature. The mixture is then cooled down to 136° C., and a further 10 parts by weight of dimethylbenzylamine are added. The temperature is maintained until an epoxy equivalent weight of 1,500 has been reached. The mixture is then cooled down to 85° C., and 725 parts by weight of a 75% strength crosslinking agent solution (component B) according to Example 3 are added. The temperature is again allowed to rise to 85° C., and 515 parts by weight of a 70% strength solution of 1 mole of diethylenetriamine and 2 moles of methyl isobutyl ketone are added. The batch heats up during this addition. The temperature is maintained by external cooling for 60 minutes between 95° and 100° C.

0.5 part by weight, relative to the total solids content, of dibutyltin dilaurate is then added as crosslinking catalyst. The batch is adjusted with solvent naphtha to a suitable processing viscosity as clear lacquer. The clear lacquer can be hardened at 160° C. in the course of 20 minutes to give a transparent, glossy coating.

EXAMPLE 12

In a 6 l reactor, 1,453 g of a 90% strength solution of the ketimine formed from monoisopropanolamine and methyl ethyl ketone in methyl ethyl ketone are added to 3,380 g of partially epoxidized polybutadiene (molecular weight 2,600 and 4.8% by weight of epoxide oxygen), and 32.5 g of phenol are added as catalyst. The mixture is heated to 160° C. and maintained at this temperature until epoxide oxygen is no longer detectable. The batch is then cooled to 90° C. and 30% by weight, relative to the solids content, of the solution of Example 2 and containing the crosslinking agent is added. A sprayable clear lacquer is obtained by adding methyl ethyl ketone. The film is stoved for 30 minutes at 150° C. and afterwards has excellent elasticity.

EXAMPLE 13

137 g of diethylenetriamine are initially introduced into a reaction vessel and heated to 80° C. 1,482 g of a 75% strength solution, in methyl ethyl ketone, of a commercially available epoxide resin based on bisphenol A having an epoxide equivalent weight of 800 to 900 are added in the course of 3 hours. The temperature is then increased to 90° C. and this temperature is maintained for one hour. The solvent is then carefully removed in vacuo. The resulting melt is poured into a trough and, after cooling down, broken and milled.

The binder described above is then homogenized in an extruder together with 25% by weight of the crosslinking agent according to Example 1, freed from solvent, and 60% by weight of titania (rutile type).

Customary working up produces a powder lacquer suitable for the electrostatic powder spraying method. The films are stoved for 20 minutes at 160° C. Pure white, glossy films are obtained. The powder is also suitable for wet milling in water and processing as aqueous powder slurry.

We claim:

1. In a process for preparing coatings by applying a coating agent in the form of a film to a substrate and subsequently hardening the film by stoving, said coating agent containing a binder mixture, the improvement comprising said binder mixture comprising:
   (A) an organic resin having amino groups; and
   (B) a cross-linking agent based on an organic compound which contains at least 2 β-hydroxyalkyl ester groups.

2. The process of claim 1, wherein said amino groups are primary amino groups.

3. The process of claim 1, wherein said amino groups are secondary amino groups.

4. The process of claim 1, wherein said amino groups are primary and secondary amino groups.

5. The process of claim 1, wherein said amino groups are primary and tertiary amino groups.

6. The process of claim 1, wherein said amino groups are secondary and tertiary amino groups.

7. The process of claim 1, wherein said amino groups are primary, secondary, and tertiary amino groups.

8. The process of claim 1, wherein said binder mixture, in addition to components (A) and (B), contains as component (C) pigments, fillers, cross-linking catalysts, corrosion inhibitors and other paint auxiliaries.

9. The process of claim 8, wherein the proportion of component (A) is 50-95% by weight, component (B) is 5-50% by weight, the total amount of the components (A) and (B) being 100%.

10. The process of claim 9, wherein component (A) has a number average molecular weight of 500-20,000.

11. The process of claim 10, wherein component (B) has a number average molecular weight of 200-10,000.

12. The process of claim 11, wherein component (B) is a polyacrylate resin prepared from the following monomers:
   (a) 10-50% by weight of an alkyl acrylate having 1 to 18 carbon atoms in the alkyl radical, an alkyl methacrylate having 2 to 18 carbon atoms in the alkyl radical or a mixture thereof;
   (b) 0-60% by weight of methyl methacrylate;
   (c) 0-35% by weight of styrene, α-methylstyrene, o-chlorostyrene, p-chlorostyrene, p-tert.-butylstyrene, vinyltoluene, vinylcarbazole or mixtures thereof; and
   (d) 2-35% by weight of a β-hydroxyalkyl acrylate, β-hydroxyalkyl methacrylate, another olefinic, unsaturated polymerizable compound containing β-hydroxyalkyl ester groups or mixtures thereof, the total amount of the constituents (a), (b), (c) and (d) being 100%.

13. The process of claim 12, wherein the coating agent is present in a finely divided, solid form.

14. The process of claim 13, wherein the coating agent is applied by using an electrostatic powder spray device.

15. The process of claim 12, wherein said binder mixture is present dissolved in an organic solvent.

16. The process of claim 15, wherein the coating agent is applied by spraying, dipping, flowing, rolling or knife-coating.

17. The process of claim 1, wherein an electrically conductive substrate is dipped into an aqueous bath of the coating agent which is at least partially neutralized by acid and connected as the cathode, the film is deposited on the substrate by means of direct current, the substrate is removed from the bath and the film is hardened by said stoving.

18. In a substrate coated with a binder mixture, the improvement comprising said binder mixture comprising:
   (A) an organic resin having amino groups; and
   (B) a cross-linking agent based on an organic compound which contains at least 2 β-hydroxyalkyl ester groups.

19. The coated article of claim 18, wherein said binder mixture, in addition to components (A) and (B), contains as component (C) pigments, fillers, cross-linking catalysts, corrosion inhibitors and other paint auxiliaries.

20. The coated article of claim 19, wherein the proportion of component (A) is 50-95% by weight, component (B) is 5-50% by weight, the total amount of the components (A) and (B) being 100%.

21. The coated article of claim 20, wherein component (A) has a number average molecular weight of 500-20,000.

22. The coated article of claim 21, wherein component (B) has a number average molecular weight of 200-10,000.

23. The coated article of claim 22, wherein component (B) is a polyacrylate resin prepared from the following monomers:
   (a) 10-50% by weight of an alkyl acrylate having 1 to 18 carbon atoms in the alkyl radical, an alkyl methacrylate having 2 to 18 carbon atoms in the alkyl radical or a mixture thereof;
   (b) 0-60% by weight of methyl methacrylate;
   (c) 0-35% by weight of styrene, α-methylstyrene, o-chlorostyrene, p-chlorostyrene, p-tert.-butylstyrene, vinyltoluene, vinylcarbazole or mixtures thereof; and
   (d) 2-35% by weight of a β-hydroxyalkyl acrylate, β-hydroxyalkyl methacrylate, another olefinic, unsaturated polymerizable compound containing β-hydroxyalkyl ester groups or mixtures thereof, the total amount of the constituents (a), (b), (c) and (d) being 100%.

24. The coated article of claim 23, wherein said binder mixture is present in a finely divided, solid form.

25. The process of claim 1, wherein the β-hydroxyalkyl ester groups of component (B) react with the amino groups of component (A) to form an amide bond and the basic nitrogen of the amino group of the resin of component (A) is converted in the stoved film into amide nitrogen of neutral pH.

26. The coated article of claim 18, wherein the β-hydroxyalkyl ester groups of component (B) react with the amino groups of component (A) to form an amide bond and the basic nitrogen of the amino group of the resin of component (A) is converted in the stoved film into amide nitrogen of neutral pH.

* * * * *